United States Patent [19]
Dehne

[11] 3,720,172
[45] March 13, 1973

[54] CONVEYOR CARRIER TOW BAR
[75] Inventor: Clarence A. Dehne, Farmington, Mich.
[73] Assignee: Jervis B. Webb Company
[22] Filed: July 29, 1970
[21] Appl. No.: 59,321

[52] U.S. Cl..................104/172 S, 104/89, 188/312
[51] Int. Cl..............................................B65g 17/42
[58] Field of Search........104/172 S, 172 BT, 178, 89, 104/96; 188/312, 316; 105/148, 75; 293/43

[56] References Cited

UNITED STATES PATENTS

| | | | |
|---|---|---|---|
| 2,823,915 | 2/1958 | Carbon | 267/8 |
| 3,107,753 | 10/1963 | Georgette | 188/94 |
| 3,110,367 | 11/1963 | Roberts | 188/96 |
| 3,456,597 | 7/1969 | Jackson | 105/30 |
| 3,541,967 | 11/1970 | Birkhead | 104/172 S |
| 3,478,698 | 11/1969 | Jones | 104/172 BT |

Primary Examiner—Gerald M. Forlenza
Assistant Examiner—Robert Saifer
Attorney—Farley, Forster and Farley

[57] ABSTRACT

A conveyor carrier, having a driving trolley with a driving dog engageable by a propelling pusher and at least one other trolley, the driving trolley being connected to the other trolley by a tow bar which has two motion transmitting or coupling members interconnected for relative longitudinal movement so that the spacing between the trolleys can increase and decrease within limits defined by abutments on the coupling members. Relative movement between the coupling members is yieldingly opposed by a cylinder and piston damper isolated from forces transmitted through the coupling members.

10 Claims, 2 Drawing Figures

INVENTOR
CLARENCE A. DEHNE
BY Farley Forster and Farley
ATTORNEYS

3,720,172

CONVEYOR CARRIER TOW BAR

SUMMARY OF THE INVENTION

This invention relates to improvements in a power and free conveyor having a load carrier supported from a carrier track by a plurality of trolleys one of which is a driving trolley equipped with a driving dog engageable by a pusher of a propelling member supported by an adjacent track. These improvements are particularly directed to a coupling of the driving trolley to the carrier which will reduce the impact load on components of the conveyor resulting from acceleration and deceleration of the carrier.

In conveyors of this type, the carriers are frequently each equipped with a releasable driving dog on the driving trolley, moveable between driving and non-driving positions relative to a pusher, thereby enabling carrier movement to be arrested by a stopping device and other carriers to stop and accumulate behind a stopped carrier. An example of such a releasable dog driving trolley is disclosed in U.S. Pat. No. 3,044,416, and a stopping device for use therewith is found in U.S. Pat. No. 3,229,645. Carrier movement is arrested by some portion of the driving trolley hitting an abutment forming part of the stopping device after the driving dog has been moved to non-driving position. The carrier is restarted by withdrawing the stopping device which permits the driving dog to return to driving position and be abruptly engaged by an oncoming pusher of the continuously moving propelling chain.

This start and stop operation results in impact loads on the pushers, the propelling chain, the driving dog, the driving trolley, the carrier and the article being handled thereon, which loads increase in severity and destructiveness as the weight of the carrier and speed of the propelling chain increase, and create service problems and limitations on the use and application of these conveyors.

The object of this invention is to provide a construction capable of absorbing or reducing impact forces on all components of the conveyor subject thereto resulting from acceleration and deceleration of a carrier of the type suspended from the carrier track by two or more trolleys, one of which is a driving trolley.

This construction includes a tow bar consisting of a coupling member connected to the driving trolley and another coupling member connected to a portion of the carrier spaced longitudinally of the carrier track from the driving trolley. The coupling members are interconnected for relative longitudinal movement so that the length of the tow bar can increase and decrease within limits determined by suitable abutment means, and the relative longitudinal movement is yieldingly opposed by an impact absorbing device interposed between the coupling members.

Preferably, the impact absorbing device is an air filled, relatively sealed, cylinder mounted on one of the coupling members so as to be shielded from damage thereby, and a piston in the cylinder secured to a rod portion on the other coupling member. The piston stroke is limited by the abutment means so that no impact forces are transmitted from the piston to the cylinder. Acceleration or deceleration forces on the carrier will result in relative longitudinal movement between the coupling members and movement of the piston in the cylinder, causing air to be displaced from one side of the piston to the other through a suitable restricted passage.

Other features and advantages of the invention will appear from the description to follow of the embodiment disclosed in the accompanying drawings.

DESCRIPTION OF THE PREFERRED EMBODIMENT

Figure 1:
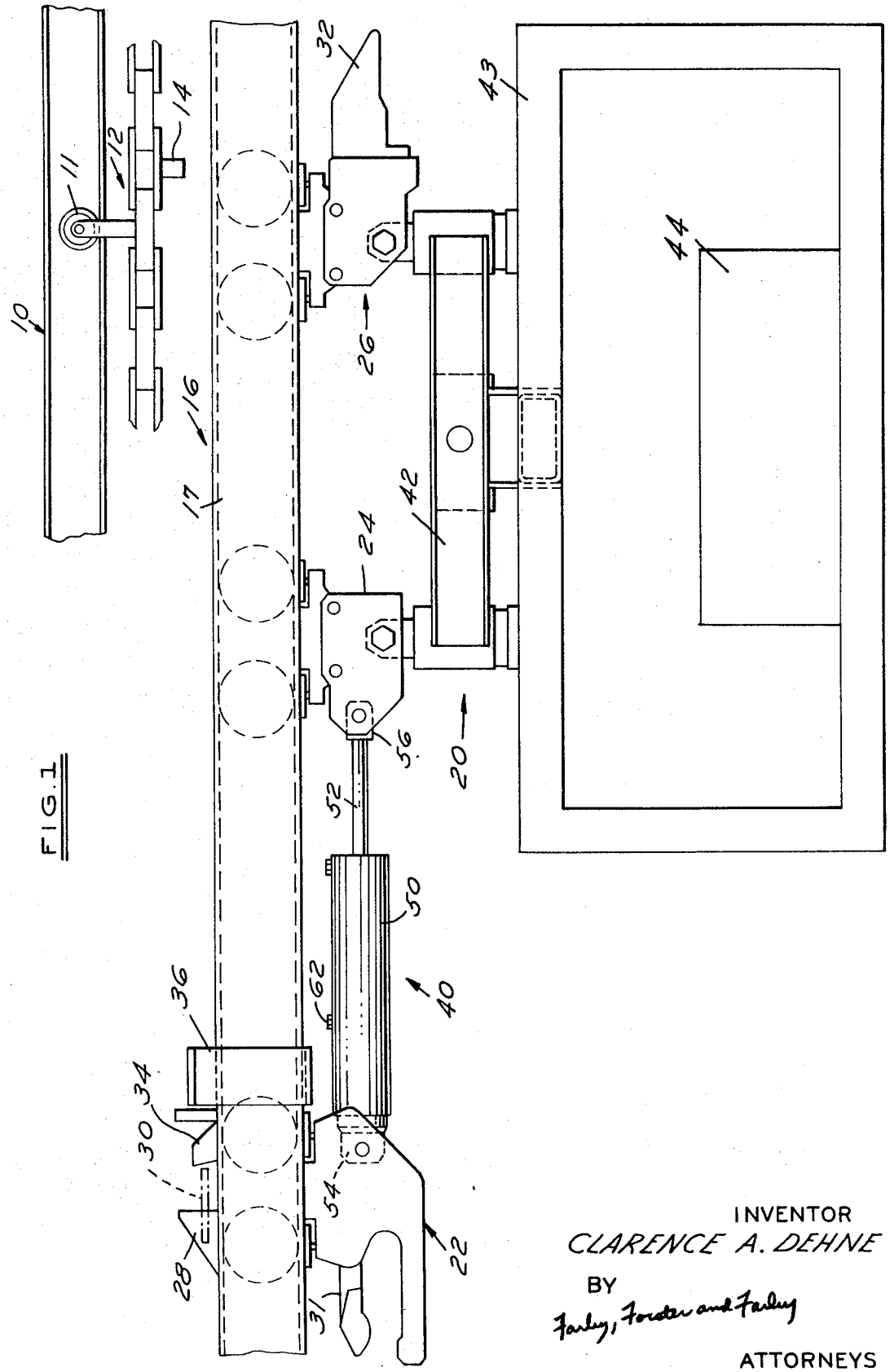
FIG. 1 is a schematic side elevation of a portion of a conveyor track and a carrier; and, FIG. 2 is an enlarged sectional elevation of the tow bar portion of the carrier of FIG. 1.

The conveyor construction illustrated in FIG. 1 includes an upper track 10, of I-beam section, supporting trolleys 11 connected to an endless propelling chain 12 equipped with depending pushers 14. In normal operation of the conveyor, the chain 12 is continuously driven by a driving unit (not shown). A carrier track 16 is mounted below the track 10 and consists of a pair of transversely spaced channel section members 17 which support the trolleys of a carrier 20. These trolleys include a leading driving trolley 22, an intermediate trolley 24 and a trailing trolley 26.

The specific arrangement of trolleys shown is illustrative only and will vary from installation to installation in accordance with the requirements of the load to be handled. For purposes of the present invention, it is only necessary that a carrier include at least two trolleys, one of which is equipped with a driving dog engageable by a pusher 14 of the propelling chain 12.

In the construction shown, a driving dog 28 on the driving trolley 22 is releasable, being moveable between an upper driving position and a lower non-driving position relative to a pusher 14 either by the action of a stop plate 30 or by the action of a driving dog releasing lever 31 pivoted on the front of the driving trolley and engageable with an actuating cam 32 on the rear trolley 26 of a preceding overtaken carrier. Further information on a driving trolley of this particular type may be found in U.S. Pat. No. 3,044,416, as previously mentioned.

The stop plate 30 forms part of a stopping device and is moveable by suitable actuating means (as shown in U.S. Pat. 3,229,645) into and out of the path of travel of the driving dog 28. When in the former or operative position, the stop plate 30 is engaged by and depresses the driving dog 28, and is then abutted by a hold-back dog 34 on the driving trolley to arrest forward movement thereof. A pivoted anti-backup pawl 36 swings in behind the driving trolley and prevents rebounding movement. When the stop plate is moved to a non-operative position, the driving dog 28 returns to driving position and is engaged by the next advancing pusher of the continuously moving chain 12.

The driving trolley 22 is connected to the intermediate trolley 24 by a tow bar assembly 40, and the intermediate trolley 24 is connected to the trailing trolley 26 by a load bar 42 from which the load carrying portion 43 of the carrier and load 44 thereon are suspended.

The operation of this type of driving trolley 22 and stop plate 30 produces sudden stopping and starting movements of the carrier 20 and subjects various components of the conveyor to relatively high impact loads resulting from the deceleration and acceleration forces. These conveyor components include the driving dog 28; the stop plate 30; the chain 12 and pushers 14; the tow bar 40; load bar 42 and their connections to the carrier trolleys; and, the load carrying portion 43 of the carrier and any load 44 being handled thereon. Such forces are also created by the sudden stopping of a driven carrier which overtakes a preceding stopped carrier and accumulates, by any starting or stopping of the conveyor chain 12 and by any surges in chain movement. Hence the problems created by impact loading resulting from acceleration and deceleration forces are not confined to conveyor systems incorporating carriers with releasing dog type of driving trolleys such as illustrated, but are encountered in any type of conveyor installation employing carriers each equipped with a trolley having a driving dog engageable by a pusher of a driven chain. These problems may be substantially reduced in any conveyor system of this general type having multiple-trolley carriers by application of the principals of the present invention, embodied in the construction of the tow bar assembly 40 illustrated in FIG. 2.

This assembly includes a pair of coupling members 50 and 52, one of which is secured to the driving trolley 22 and the other to a portion of the carrier 20 spaced longitudinally of the driving trolley, preferably the intermediate trolley 24, or next trolley adjacent the driving trolley. The coupling member 50 is a cylindrical tube equipped with a clevis fitting 54 at one end thereof which is suitably attached to the driving trolley 22 by a conventional universal pivotal connection (not shown). The coupling member 52 is a cylindrical rod having a clevis fitting 56 secured to one end thereof for attachment to the body of the intermediate trolley 24 by a similar universally pivoting connection (not shown).

The coupling members 50 and 52 are interconnected for relative longitudinal movement. Cylindrical blocks 60 and 61 are positioned inside the tubular coupling member 50 and secured thereto in longitudinally spaced relation by a suitable series of circumferentially spaced bolts 62. Each of the blocks carry a bearing 64 and a portion of the cylindrical rod coupling member 52 is slidably supported in this pair of bearings 64. The blocks 60 and 61 also serve as part of a means for limiting the extent of relative longitudinal movement between the coupling members 50 and 52, the block 60 serving as an abutment engaged by a nut 66 on the end 67 of the coupling member 52 and the block 61 serving as an abutment engaged by a collar 68 to which the clevis fitting 56 is attached at the other end of the coupling member 52.

Relative longitudinal movement between the coupling members is yielding resisted by impact absorbing means which in the construction shown include a cylinder 70 fixed relative to the coupling member 50 and engaged by a piston 72 fixed on the coupling member 52 by a pair of retaining rings 73. The cylinder 70 is formed of a tubular member 74 press fitted to a pair of end wall members 76, the tubular member 74 having an external diameter less than the internal diameter of the tubular coupling member 50 to provide an annular clearance 78. The end wall members 76 are each secured to one of the blocks 60 and 61 and thus locate the cylinder 70 in concentric relation with the longitudinal axis of movement of the piston 72.

The extent of the relative longitudinal movement of the coupling members 50 and 52, as limited in one direction by abutment between the nut 66 and block 60, and in the other direction by abutment between the collar 68 and block 61, is less than the length of the cylinder 70. Consequently, impact forces are not transmitted by contact between the piston 72 and the ends of the cylinder 70. The annular clearance 78 between the cylinder 70 and tubular coupling member 50 aids in protecting the cylinder 70 against possible damage in service and also permits the tubular coupling member 50 to be made from a relatively inexpensive, non-precision material such as standard pipe. This type of construction also enables the tow bar 40 to be used for suspending the load carrying portion of the carrier if desired, in the case where the carrier includes but two longitudinally spaced trolleys. In such an application, the load carrying portion of the carrier would ordinarily be suspended from the tubular coupling member 50.

Figure 2:
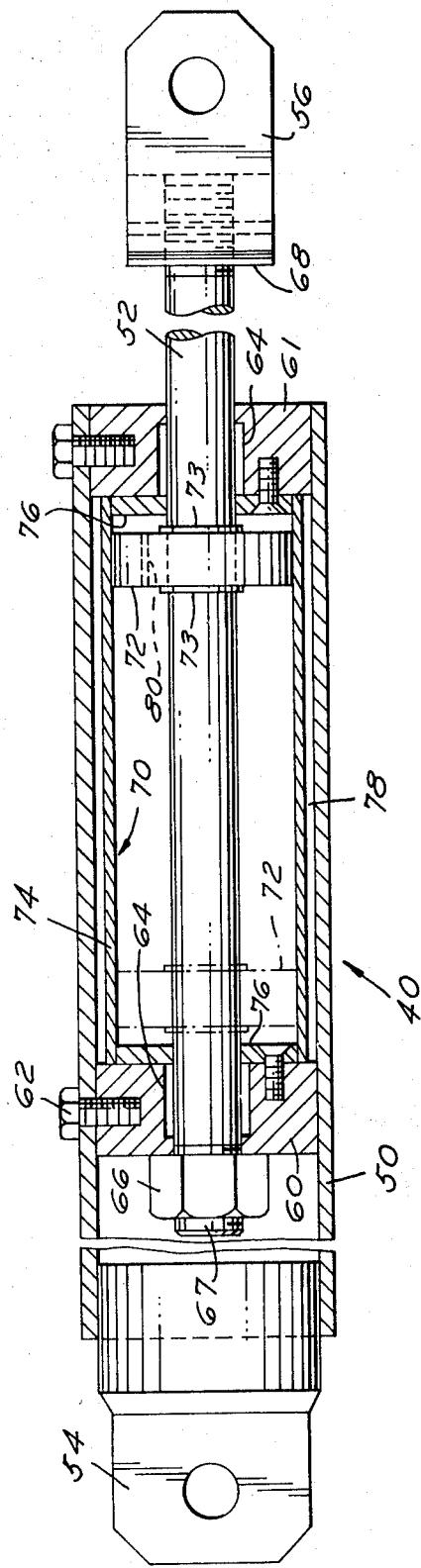

In the operation of the conveyor illustrated, the application of a decelerating force to the carrier, as by contact with the stop plate 30, results in movement of the coupling member 52 and piston 72 from the position shown in FIG. 2, reducing the spacing between the driving trolley 22 and the intermediate trolley 24. The cylinder 70 is filled with air, and this movement causes air to be displaced from one side of the piston 72 to the other through a suitable restriction such as the orifice 80, thus absorbing at least a portion of the momentum of the load carrying portion of the carrier and reducing the impact loading on all components of the conveyor. This movement of the piston 72 may continue until further movement of the coupling member 52 is limited by engagement of the abutment 68 with the abutment surface on the block 61. No springs are included in the construction and hence the coupling members 50 and 52 tend to remain in the position they occupy when relative movement between them stops. When the carrier is started by allowing the driving dog to be re-engaged by a pusher 14, the coupling members 50 and 52 relatively move in the opposite direction with the piston 72 and cylinder 70 again acting to absorb and reduce the impact loads until the relative movement is limited by abutment between the nut 66 and block 60 and the tow bar assembly then acts as a towing link between the driving trolley 22 and intermediate trolley 24.

I claim:

1. In a conveyor having a carrier which includes a plurality of trolleys mounted in spaced relation along a carrier track, one of the trolleys being a driving trolley equipped with a driving dog engageable by a pusher of propelling means supported on an adjacent track, the improvement comprising:
   a tow bar including a pair of coupling members,
   means attaching one of said members to the driving trolley and the other of said members to a portion of the carrier spaced longitudinally of the carrier track from the driving trolley,
   means interconnecting said members for relative movement there-between to permit a change in the spacing between the driving trolley and said portion of the carrier to which the other of said members is attached in response to acceleration and deceleration forces on the driving trolley, abutment means between said members limiting such relative movement in directions of increase and decrease in said spacing and causing said members to form a link of one length for transmitting acceleration forces and of another length for transmitting deceleration forces, and impact absorbing means interposed between said members yieldingly opposing such an increase and decrease in the spacing, said abutment means being arranged to prevent the transmittal of acceleration and deceleration forces by contact between the impact absorbing means and said coupling members.

2. A conveyor according to claim 1 wherein the pair of coupling members consist of an outer tubular member and an inner member, the means interconnecting said members including bearing means carried by the outer tubular member and slidably engaged by the inner member.

3. A conveyor according to claim 2 wherein the impact absorbing means includes a piston secured to the inner member.

4. A conveyor according to claim 2 wherein the impact absorbing means includes a cylinder mounted within the outer tubular coupling member and fixed relative thereto, a piston in said cylinder, the inner coupling member having a rod portion extending within said cylinder and secured to the piston.

5. A conveyor according to claim 4 wherein the cylinder is a relatively sealed unit having side and end walls, and the piston is provided with opposed faces and with a restricted passage for fluid flow between said faces.

6. A conveyor according to claim 4 including means supporting the cylinder in radially spaced relation to the outer tubular coupling member.

7. A conveyor according to claim 6 wherein said means supporting the cylinder comprise a pair of partition members fixed within the tubular coupling member in longitudinally spaced relation, the cylinder being mounted between said partition members and secured thereto.

8. A conveyor according to claim 7 wherein the cylinder is a relatively sealed unit having end walls each secured to one of said partition members, and the piston is provided with opposed faces and with a restricted passage for fluid flow between said faces.

9. A conveyor according to claim 1 wherein the pair of coupling members consist of an outer cylindrical tubular member and an inner member having a rod portion, the means interconnecting said coupling members include longitudinally spaced bearings mounted within the outer coupling member and slidably engaged by the rod portion of the inner coupling member, and the impact absorbing means includes a cylinder mounted within the outer coupling member and fixed relative thereto and a piston in the cylinder connected to the rod portion of the inner coupling member.

10. A conveyor according to claim 9 wherein the abutment means prevent contact between said piston and the ends of said cylinder.

* * * * *